United States Patent
Sanz et al.

(10) Patent No.: US 10,093,062 B2
(45) Date of Patent: Oct. 9, 2018

(54) BUILDING BLOCK FOR A MECHANICAL CONSTRUCTION

(71) Applicant: AKTIEBOLAGET SKF, Göteborg (SE)

(72) Inventors: Alejandro Sanz, Nieuwegein (NL); Stellario Barbera, Hilversum (NL)

(73) Assignee: AKTIEBOLAGET SKF, Gothenburg (SE)

( * ) Notice: Subject to any disclaimer, the term of this patent is extended or adjusted under 35 U.S.C. 154(b) by 142 days.

(21) Appl. No.: 15/106,797

(22) PCT Filed: Dec. 18, 2014

(86) PCT No.: PCT/EP2014/078361
§ 371 (c)(1),
(2) Date: Jun. 20, 2016

(87) PCT Pub. No.: WO2015/091727
PCT Pub. Date: Jun. 25, 2015

(65) Prior Publication Data
US 2017/0021568 A1 Jan. 26, 2017

(30) Foreign Application Priority Data
Dec. 18, 2013 (GB) .................................. 1322417.5

(51) Int. Cl.
*B29C 64/386* (2017.01)
*B29C 64/00* (2017.01)
(Continued)

(52) U.S. Cl.
CPC ............ *B29C 64/386* (2017.08); *B29C 64/00* (2017.08); *B29C 67/0051* (2013.01);
(Continued)

(58) Field of Classification Search
USPC ........................ 264/40.1, 129, 131, 132, 347
See application file for complete search history.

(56) References Cited

U.S. PATENT DOCUMENTS 4,334,166 A * 6/1982 Miyahara ............... H02K 29/08
310/268
5,385,410 A 1/1995 Shirai et al.
(Continued)

FOREIGN PATENT DOCUMENTS

| | | |
|---|---|---|
| GB | 1484796 A | 9/1977 |
| JP | 2006153577 A | 6/2006 |
| WO | 9320993 A1 | 10/1993 |

*Primary Examiner* — Sing P Chan
(74) *Attorney, Agent, or Firm* — Bryan Peckjian; SKF USA Inc. Patent Dept.

(57) ABSTRACT

The invention provides a building block for a mechanical construction. The invention further provides a bearing and a method of producing the building block. The building block provides a first printed material printed via an additive manufacturing process on or at least partially embedded in a second material. The first printed material is printed in a pattern configured and constructed for cooperating with a sensor for providing position information of the building block relative to the sensor. The sensor may be a magnetic sensor or an optical sensor. The first printed material may include magnetic particles. The method of producing the building block may include a step of adding the first printed material to the second material via the additive manufacturing process under the influence of a predefined magnetic field.

11 Claims, 6 Drawing Sheets

(51) Int. Cl.

| | | |
|---|---|---|
| *B29C 70/88* | (2006.01) | |
| *G01D 5/244* | (2006.01) | |
| *B33Y 50/00* | (2015.01) | |
| *B33Y 10/00* | (2015.01) | |
| *B33Y 70/00* | (2015.01) | |
| *B33Y 80/00* | (2015.01) | |
| *F16C 19/52* | (2006.01) | |
| *F16C 41/00* | (2006.01) | |
| *F16C 33/62* | (2006.01) | |
| *F16C 19/36* | (2006.01) | |
| *B29C 67/00* | (2017.01) | |
| *B29L 31/04* | (2006.01) | |
| *B29L 15/00* | (2006.01) | |
| *B29L 11/00* | (2006.01) | |

(52) U.S. Cl.
CPC .............. *B29C 70/88* (2013.01); *B33Y 10/00* (2014.12); *B33Y 50/00* (2014.12); *B33Y 70/00* (2014.12); *B33Y 80/00* (2014.12); *F16C 19/364* (2013.01); *F16C 19/52* (2013.01); *F16C 33/62* (2013.01); *F16C 41/007* (2013.01); *G01D 5/244* (2013.01); *B29K 2995/0008* (2013.01); *B29L 2011/00* (2013.01); *B29L 2015/00* (2013.01); *B29L 2031/04* (2013.01); *F16C 2220/24* (2013.01)

(56) References Cited

U.S. PATENT DOCUMENTS

| | | |
|---|---|---|
| 2005/0201648 A1 | 9/2005 | Takada |
| 2010/0009133 A1 | 1/2010 | Chait |
| 2015/0090392 A1* | 4/2015 | Bertrand ................ B32B 43/00 156/64 |

* cited by examiner

BUILDING BLOCK FOR A MECHANICAL CONSTRUCTION

CROSS-REFERENCE TO RELATED APPLICATIONS

This application is the U.S. national stage of International Application No. PCT/EP2014/078361 filed on Dec. 18, 2014, which claims priority to Great Britain patent application no. 1322417.5 filed on Dec. 18, 2013, the contents of which are both fully incorporated herein by reference.

FIELD OF THE INVENTION

The invention relates to a building block for a mechanical construction. The invention further relates to a bearing, to an actuator system, a gear box, a system and to a method of producing the building block.

BACKGROUND ART

Additive manufacturing or more commonly called 3D printing is a known production technique in which a three-dimensional solid object is generated from a digital model. The process of additive manufacturing starts with generating the digital model via any known digital modeling methods, such as using a CAD program. Next, the digital model is divided into slices in which each slice indicates for this layer of the digital model where the printed material should be located. The individual slices are sequentially fed into an additive manufacturing tool or 3D printer which deposits the material according to the individual slices and as such generates the complete three-dimensional solid object layer by layer.

In the early days of additive manufacturing, mainly plastic materials or resins have been used as printed material for generating the three-dimensional solid object, but other processes have been developed in which also other materials, including different types of metal may be deposited in layers using this additive manufacturing technique. A major benefit of this manufacturing technique is that it allows the designer to produce virtually any three-dimensional object in a relatively simple production method. This may be especially beneficial when, for example, an initial model is required of a product or when only a limited number of products are required. A drawback of this manufacturing technique is the speed at which the three-dimensional solid objection is produced.

The use of additive manufacturing in high-quality bearings or actuators has been limited. However the possibilities it may provide seem unlimited.

SUMMARY OF THE INVENTION

One of the objects of the invention is to provide a building block which can interact with a sensor.

A first aspect of the invention provides a building block for a mechanical construction according to claim 1. A second aspect of the invention provides the bearing according to claim 9. A third aspect of the invention provides the actuator system according to claim 10. A fourth aspect of the invention provides the gear box according to claim 11. A fifth aspect of the invention provides the system according to claim 12. And the sixth aspect of the invention provides the method according to claim 13. Embodiments are defined in the dependent claims.

The building block in accordance with the first aspect of the invention comprises a first printed material printed via an additive manufacturing process on or at least partially embedded in a second material, wherein the first printed material is printed in a pattern configured and constructed for cooperating with a sensor for providing, in use, position information of the building block relative to the sensor.

The inventors have realized that the use of printed material in building blocks for mechanical constructions provide the opportunity to include a pattern of first printed material on or at least partially inside the second material such that the pattern of the first printed material may directly interact with the sensor for providing position information of the position of the building block relative to the sensor. The printing of the first printed material on or at least partially into the second material enables to provide a graded and controlled distribution of the first printed material in the pattern which enhances the performance and accuracy of the signal received by the sensor. Furthermore, the use of the first printed material to generate the pattern enables to miniaturize the pattern which may be used to achieve a maximum number of pulses to the sensor in the available space at the building block during the relative motion of the building block relative to the sensor. Using the maximum number of pulses also improves the overall accuracy of the sensed information.

A further benefit when using the pattern printed using the first printed material is that the pattern may be directly applied onto the building block. Often, encoder discs need to be added to a system to ensure that the relative motion of a building block relative to the sensor may be measured. This additional encoder disc may be expensive and is an additional element that needs to be added to the building block or system to allow the overall positioning of the building block relative to the sensor to be measures. Directly printing the pattern using the first printed material onto the building block obviates the need for an additional encoder disc, making the overall sensing solution more robust and compact.

From this position information of the first printed material relative to the sensor, in use, additional physical variable may be captured such as linear or angular position or speed, accelerations, and absolute or relative position and displacements. The more dense the first printed material is printed and the higher the contrast between the first printed material and the second material, the more accurate the measurement can be performed. Also high density of the magnetic particles in the first printed material allows the sensor to be placed further away from the first printed material, which enables more design freedom while maintaining high accuracy. The sensor may be a magnetic sensor or an optical sensor or based on another physical principle.

In an embodiment of the building block, at least a part of the building block is constituted of the second material being second printed material printed via an additive manufacturing process. The second printed material may, for example, be a polymer or ceramic, while the first printed material may be a metal or may contain magnetic particles to interact with a magnetic sensor. Using the second printed material provides a maximum freedom in design of the building block which may be produced using the additive manufacturing techniques. As such, substantially any three-dimensional building block may be generated having a pattern of the first printed material added for interaction with the sensor.

A further benefit when using the second printed material is that hollow structures may be included in the second printed material for reducing the overall weight of the building block and for using the hollow structures to include other elements into the building block, such as additional sensors, heat transfer channels and hollow structures for providing lubricants.

In an embodiment of the building block, the first printed material comprises magnetic particles for cooperating with a magnetic sensor. Embedding the magnetic particles in the pattern on or at least partially embedded in the second material increases a mechanical reliability and may be used to reduce wear of the often expensive magnetic material. Furthermore, pulse generators often require a relatively high intensity in the ferromagnetic signal and therefore a relatively high density of the magnetic particles is required as close as possible to the reading head of the sensor. Printing the first printed material comprising the magnetic particles enables to generate the required concentration exactly at the right location such that a strong and reliable signal may be obtained by the sensor. In an embodiment of the building block, the first printed material constitutes a reflective pattern for cooperating with an optical sensor. Such a reflective pattern may, for example, be generated on a substantially opaque or transmissive second material. The sensor may comprise a light source and a light sensitive element for sensing the reflected light of the light source, reflected from the pattern of the first printed material. In an embodiment of the building block, the first printed material constitutes an opaque pattern surrounded by the second material. The second material may, for example, constitute a reflective surface, such that the light of the light source may reflect from the second material onto the sensitive element which is interrupted by the pattern of the first printed material. In an embodiment of the building block, the first printed material constitutes a contrasting pattern relative to the second material for cooperating with the optical sensor. For some optical sensors there only need to be some contrast between the first printed material and the second material, such as different color, for example, black and white. Alternatively, the second material may be transmissive for the light emitted by the light source and the sensitive element may sense the light transmitted through the second material which is interrupted by the pattern of the first printed material. In an embodiment of the building block, the first printed material constitutes a transmissive pattern surrounded by the second material being opaque or reflective. The transmissive pattern is transmissive for the light emitted by the light source of the sensor, which may be infrared, ultraviolet, visible or any other light. In this case, the light sensitive element senses the light transmitted by the pattern of first printed material which is interrupted by the second material. The light source may be a laser light source which is able to generate a relatively small light beam which improves an accuracy of the measurement.

In an embodiment of the building block, the first printed material is completely embedded in the second printed material. Alternatively, the first printed material is covered by a third material. This third material may be a coating covering the first printed material or may be a third printed material different from the first printed material and the second printed material. A benefit of this embodiment is that the pattern of the first printed material is protected from the environment by the second printed material or by the third material. Building blocks according to the invention may be used, for example, in bearings. In such environments, the embedding of the first printed material protects the first printed material from damage from vibrations, wear and fatigue. However, this embodiment may of course be valid for any moving building block.

In an embodiment of the building block, the pattern of the first printed material is configured and constructed for generating a block-wave signal at the sensor during a relative movement. In an embodiment of the building block, the pattern of the first printed material is configured and constructed for generating a sinusoidal-wave signal at the sensor during the relative movement. A benefit of this sinusoidal-wave signal is that interpolation between the measurement points is relatively easy, as the overall shape of the sinusoidal-wave signal is well known. In an embodiment of the building block, the pattern of the first printed material is configured and constructed for generating a saw-tooth signal at the sensor during the relative movement. A benefit of this saw-tooth signal is that also here interpolation between measurement points is often relatively easy, due to the linear behavior of part of the sensed signal. Of course also other signals may be used without departing from the scope of the invention.

The pattern of the first printed material comprises a first pattern for providing a first signal to the sensor and a second pattern different from the first pattern for providing a second signal to the sensor different from the first signal. The printed pattern may be a combination of the first pattern and the second pattern printed substantially at the same time. These two patterns may be used by, for example, rotational position sensors to change the phase of the second pattern relative to the first pattern to determine an absolute angular position of the rotating building block. A benefit when printing the first pattern and second pattern substantially during the same printing step is that the position accuracy of the first pattern relative to the second pattern is optimal. As such, the accuracy in the determining of the absolute angular position may optimal.

In an embodiment of the building block, the first printed material and/or the second printed material is chosen from a list comprising metals, ceramics, polymers, elastomer, and their combination in composite materials. The first printed material and/or the second printed material may, for example, be a metal, for example, selected from a list comprising steel, stainless steel, maraging steel, tool steel, low alloy steel, copper alloys, nickel alloys, cobalt alloys, aluminum, aluminum alloys, titanium, titanium alloys.

In an embodiment of the building block, an interface between the first printed material and the second printed material comprises a functionally graded interface layer, a composition of the functionally graded interface layer is configured to gradually change from the first printed material via a mixture of the first material and the second printed material to the second printed material. A benefit of such functionally graded interface layer is that the bonding between the two materials is relatively strong.

In an embodiment of the building block, the building block is an inner ring for a bearing. In an embodiment of the building block, the building block is an outer ring for the bearing. In an embodiment of the building block, the building block is a seal for the bearing. In an embodiment of the building block, the building block is an traveling unit for an actuator. In an embodiment of the building block, the building block is an encoder disc for an angular sensor. In an embodiment of the building block, the building block is a gear wheel.

The bearing in accordance with the second aspect of the invention comprises the building block according to any of the embodiments.

The actuator system in accordance with the third aspect of the invention comprises the building block according to any of the embodiments.

The gear box in accordance with the fourth aspect of the invention comprises the building block according to any of the embodiments.

The system for measuring a relative position of a building block relative to a sensor in accordance with the fifth aspect of the invention comprises the building block according to any of the embodiments and a sensor configured for interacting with the pattern of the first printed material of the building block for providing, in use, position information of the building block relative to the sensor.

The method of producing the building block in accordance with the sixth aspect of the invention comprises printing of a first printed material via an additive manufacturing process on or at least partially embedded in a second material, wherein the first printed material is printed in a pattern configured and constructed for cooperating with a sensor for providing, in use, position information of the building block relative to the sensor, wherein the pattern of the first printed material comprises a first pattern for providing a first signal to the sensor and a second pattern different from the first pattern for providing a second signal to the sensor different from the first signal.

In an embodiment, the method comprises a step of: adding the first printed material to the second material via the additive manufacturing process under the influence of a predefined magnetic field. This magnetic field may be used to set the magnetic property of the first printed material during the additive manufacturing process. In one production method, the first printed material constitutes solid particles comprising magnetic particles which are locally heated to connect the individual first printed material particles together—for example using laser selective sintering. During this heating process, the magnetic properties of the first printed material may be influenced by the applied magnetic field. This applied magnetic field may determine the magnetic properties of the solid particle attached via the additive printing process. Alternatively, the first printed material may be applied in liquid form after which it is solidified during the process. Also in such a process, the influence of the magnetic field may be used to determine the magnetic properties of the droplet of first printed material before the droplet is hardened in the additive manufacturing process. As such, a magnetic property of each droplet of first printed material or each solid particle of first printed material may be determined individually—allowing a very high level of control of the magnetic properties of the pattern of first printed material on the building block.

BRIEF DESCRIPTION OF THE DRAWINGS

These and other aspects of the invention are apparent from and will be elucidated with reference to the embodiments described hereinafter. In the drawings.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION OF EMBODIMENTS

Figure 1A:
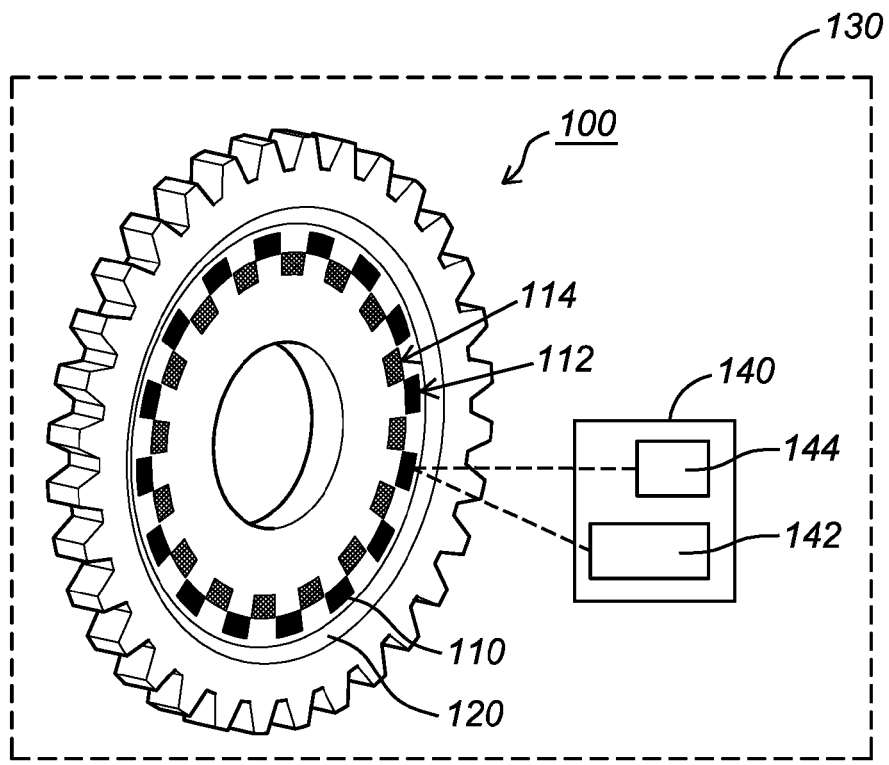
FIG. 1A shows a plan-view of a gear wheel according to the invention.

FIG. 1A shows a plan-view of a gear wheel 100 according to the invention. The gear wheel 100 being a building block 100 according to the invention, comprises a first printed material 110 printed via an additive manufacturing process in a pattern 112, 114. The pattern 112, 114 is configured and constructed to cooperate, in use, with a sensor 140 for generating position information of the gear wheel 100 relative to the sensor 140. In the embodiment shown in FIG. 1A the position information is a rotational position information of the gear wheel 100 relative to the sensor 140 and the pattern 112, 114 of the first printed material 110 comprises an angular encoder for detecting a rotational position of the gear wheel 100 relative to the sensor 140. In the embodiment shown in FIG. 1A, the pattern 112, 114 of first printed material 110 comprises reflective material which reflects light emitted from a light source 142 of the sensor 140 back towards a light sensitive element 144 of the sensor 140. When rotating the gear wheel 100 relative to the sensor 140, the signal received by the sensor 140 is depending on the pattern 112, 114 generated on the gear wheel 100. In one embodiment, the pattern 112, 114 is configured to generate a sinusoidal-wave signal when the gear wheel 100 is rotating at a constant speed in front of the sensor 140. Alternatively, the pattern 112, 114 may be configured to generate a block-wave signal when the gear wheel 100 is rotating at a constant speed in front of the sensor 140. Even further alternatively, the pattern 112, 114 may be configured to generate a saw-tooth-wave signal when the gear wheel 100 is rotating at a constant speed in front of the sensor 140. Due to the fact that the first printed material 110 is printed via the additive manufacturing process, the density of the first printed material 110 in the pattern 112, 114 may be relatively easily be adapted to obtain any of the above indicated signals from the sensor 140 and even many different signals.

The pattern 112, 114 comprises of a first pattern 112 and a second pattern 114 which is coaxially arranged relative to the first pattern 112 and which is shifted relative to the first pattern 112 and comprises a different number of encoding elements in the pattern 114. Choosing a specific number of encoder elements in the first pattern 112 and the second pattern 114 and having a sensor 114 capable of sensing the signals coming from the first pattern 112 and the second pattern 114 separately, the combination of the two signals may generate an absolute positioning of the gear wheel 100 relative to the sensor 140.

Alternatively, the first printed material 110 comprises magnetic particles and thus the first pattern 112 comprises a plurality of magnetic angular encoders arranged in a ring shaped symmetrically around the gear wheel 100. In this alternative embodiment, the sensor 140 comprises one or more magnetic sensors, such as Hall-sensors or magneto-resistive sensors. The pattern 112, 114 of magnetic angular encoders together with the sensor 140 form a rotation detection system 130 in which the first pattern 112 of magnetic encoders 112 is arranged coaxially with respect to the second pattern 114 of magnetic encoders 114 having a different number of magnetic poles compared to the first pattern 112. The system 130 may also have a plurality of magnetic sensors 140 each operable to detect the magnetic field of the corresponding first pattern 112 of magnetic encoders and second pattern 114 of magnetic encoders. The sensor 140 is configured for detecting positional information within a single magnetic pole of the corresponding magnetic encoder. A phase difference detector is used for determining the phase difference of magnetic field signals detected respectively by the magnetic sensors 140 detecting the magnetic encoders 112 of the first pattern 112 and the magnetic encoders 114 of the second pattern 114. Using the detected phase difference, an absolute rotation angle of the gear wheel 100 relative to the sensor 140 may be determined.

The first printed material 110 may be printed on top of the second material 120. Alternatively, the gear wheel 100 may at least partially be produced using the second material 120 which is a second printed material 120. In such a configuration, the first printed material 110 may be embedded, at least partially, inside the second printed material 120. A benefit when the first material 110 is at least partially embedded in the second printed material 120 is that the first material 110 may be protected against the often harsh environment in which a gear wheel 100 operates.

Figure 1B:
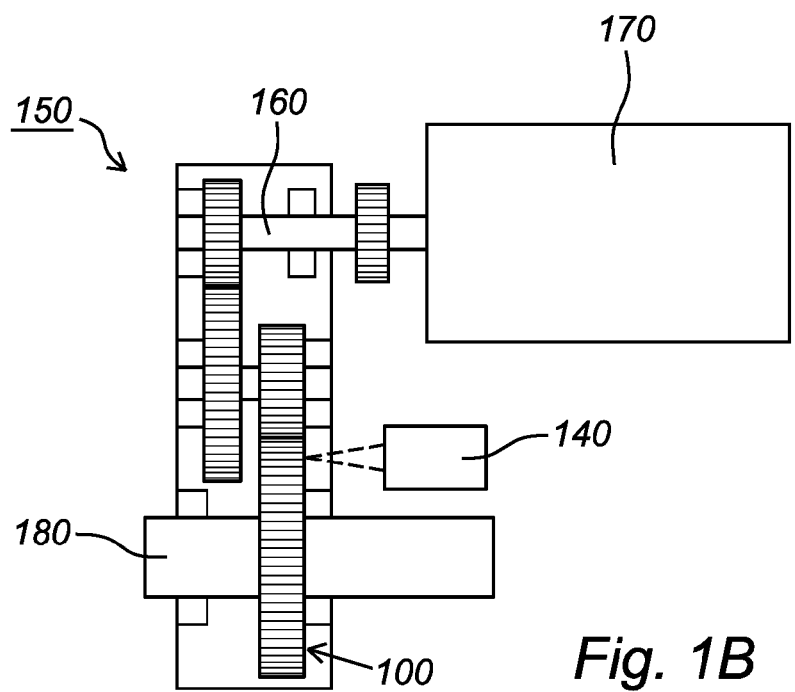
FIG. 1B shows a gear box comprising the gear wheel.

FIG. 1B shows a cut-open plan-view of a gear box 150 according to the invention. The gear box 150 is connected to a motor 170 via a first shaft 160 and the gear box 150 transfers the rotation speed of the motor 170 to a converted rotation speed of the second shaft 180. The gear box 150 comprises a plurality of gear wheels 100. One of the gear wheels 100 comprises the first printed material 110 in a pattern 112 for cooperating with a sensor 140 for determining a rotational position and/or speed of the gear wheel 100 inside the gear box 150.

Figure 2A:
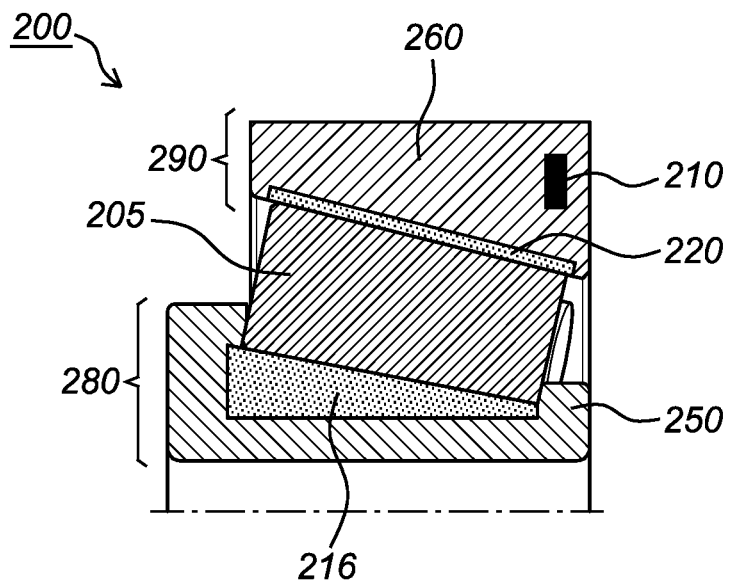
FIG. 2A shows a cross-sectional view of a bearing comprising first printed material in a pattern and a second material according to the invention.

FIG. 2A shows a cross-sectional view of a bearing 200 comprising the second printed material 250, 260 and comprising the pattern 212 (see FIG. 2B) of first material 210. The bearing 200 comprises rolling elements 205 and an inner ring 280 comprising a raceway ring 216 at which the second printed material 250 is bonded. The bearing 200 also comprises an outer ring 290 comprising the pattern 212 of the first printed material 210. The first printed material 210 is fully embedded inside the second printed material 260 such that the first printed material 210 is protected from environmental influences and wear. The pattern 212 of the first printed material 210 as shown in FIG. 2A comprises magnetic particles embedded in the first printed material 210. Each block of first printed material 210 acts as a magnetic encoder cooperating with a magnetic sensor 240 (see FIG. 2B) and the pattern 212 of first printed material 240. The outer ring 290 also comprises the raceway ring 220 to which the second printed material 260 is bonded.

Figure 2B:
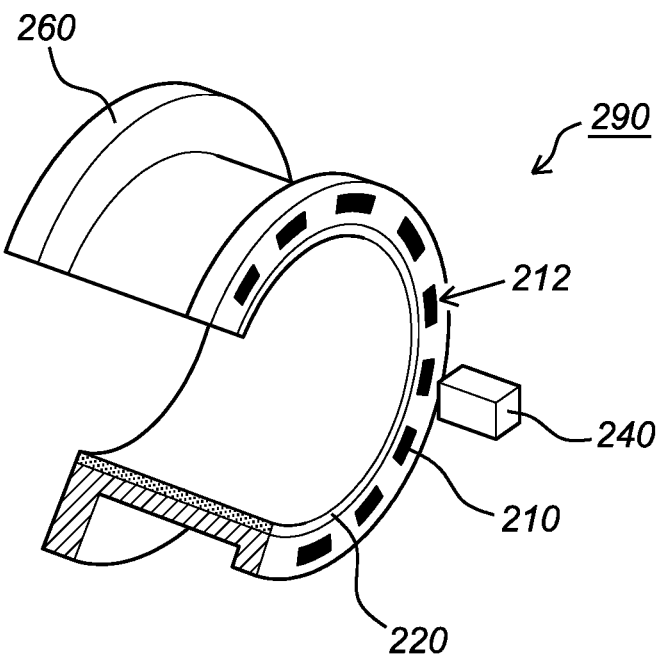
FIG. 2B shows a partially cut-open outer ring for a bearing according to the invention.

FIG. 2B shows a partially cut-open outer ring 290 for a bearing 200 according to the invention. The outer ring 290 being a building block 290 according to the invention and comprises a raceway ring 220 to which the second printed material 260 is bonded. The first printed material 210 forms a pattern 212 rotationally arranged on a rim of the outer ring 290. In use, the outer ring 290 may rotate relative to the sensor 240 and the pattern 212 of first printed material 210, for example, comprising magnetic particles generate a signal at the sensor 240 from which a relative position or rotation of the outer ring 290 relative to the sensor 240 may be established. The use of the second printed material 260 provides a very flexible way of producing the outer shape of the outer ring 260 for the bearing 200 and printing the first printed material 210 in the pattern 212 ensures that the accuracy of the pattern 212 and the position of the pattern on the outer ring 290 may be determined relatively accurately.

Figure 2C:
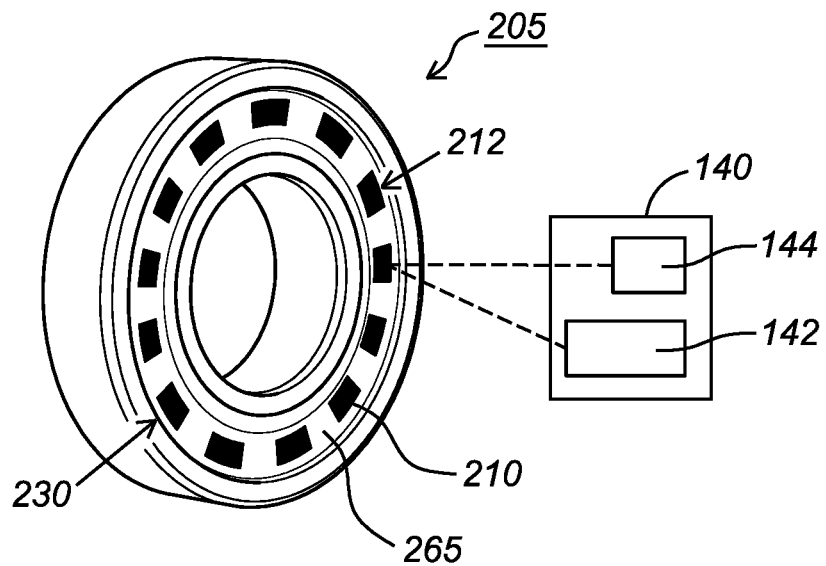
FIG. 2C shows a bearing comprising a seal according to the invention.

FIG. 2C shows a bearing 205 comprising a seal 230 according to the invention. The seal 230 comprises a pattern 212 of first printed material 210 arranged on or at least partially embedded in the second material 265, for example, second printed material 265. The pattern 212 of first printed material 210 may comprise magnetic particles embedded in the first printed material 210 to cooperate with a sensor 240 being a magnetic sensor. Alternatively, the pattern 212 of first printed material 210 may be configured to cooperate with an optical sensor 140 for providing information on a relative position of the seal 230 relative to the optical sensor 140. In a bearing 205 the seal 230 rotates either with the inner ring 280 or with the outer ring 290, depending on the configuration of the seal 230. The pattern 212 may be used to determine an angular position of the seal 230 relative to the sensor 140. Alternatively, the pattern 212 may be used in addition to an angular sensor (not shown), for example, integrated in the outer ring 290 similar as shown in FIG. 2A. In such a configuration, the signal received from the seal 230 may be used to check whether the seal 230 actually rotates together with the outer ring 290. If there is a difference between the rotation speed of the seal 230 and the outer ring 290, this may be used as an indication that the bearing 205 may require maintenance or that the lubrication of the bearing 205 may not be optimal.

Figure 3:
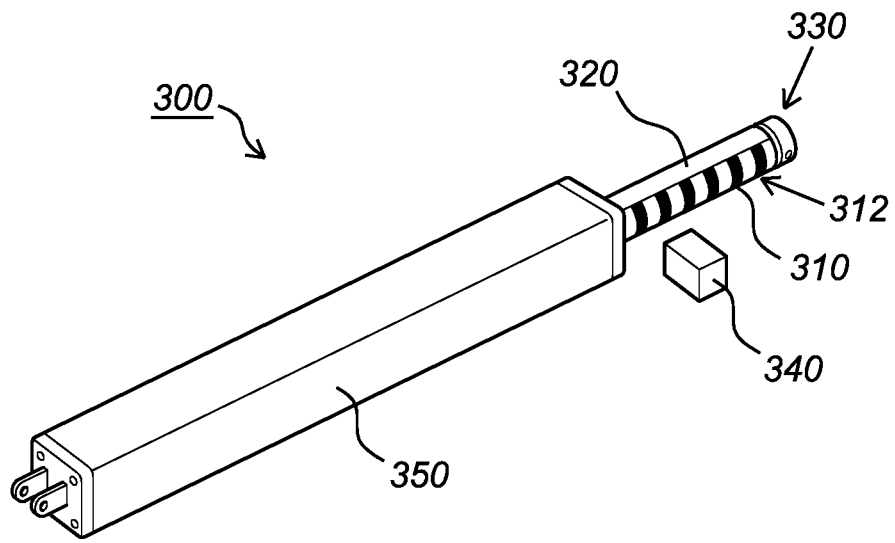
FIG. 3 shows a plan view of an actuator system according to the invention.

FIG. 3A shows a plan view of an actuator system 300 comprising a static unit 350 and a traveling unit 330. The traveling unit 330 comprises the pattern 312 of first printed material 310 printed on the second material 320. The pattern 312 of first printed material 310 may comprise a magnetic particles distributed in the first printed material 310 to interact with a sensor 340 being, for example, a magnetic sensor 340. Alternatively, the first printed material 310 may be reflective material such that light emitted from a light sensor 340 may be reflected from the pattern 312 of the first printed material 310. The reflected light may be sensed by a light sensitive element 144 (see FIG. 1A) and the signal obtained when pattern 312 of first printed material 310 of the traveling unit 330, in use, interacts with the sensor 340 may be used to determine a relative position between the traveling unit 330 and the sensor. Even further alternatively, the first printed material 310 may be configured to transmit the light emitted from the light sensor and the light sensitive element 144 may be arranged on an opposite side of the traveling unit 330 such that the transmitted light, transmitted by the first printed material 310 is blocked according to the pattern 312 by the second material 320, for example, being second printed material 320.

Figure 4A:
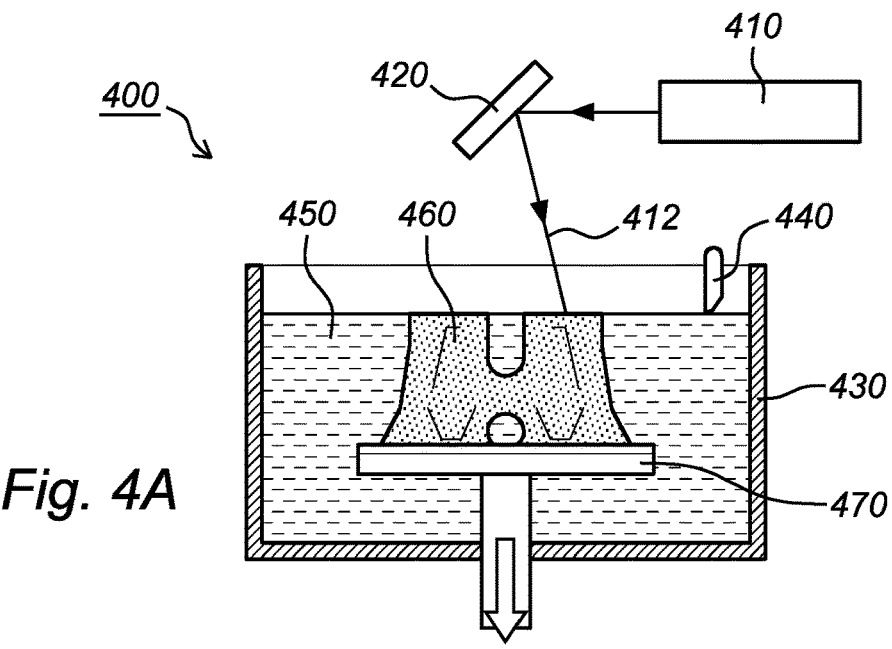
FIG. 4A shows a first embodiment of an additive manufacturing tool in which a liquid resin is used for applying the printed material in the additive manufacturing process.

FIG. 4A shows a first embodiment of an additive manufacturing tool 400 in which a liquid resin 450 is used for applying the printed material 460 in the additive manufacturing process. Such additive manufacturing tool 400 comprises resin container 430 comprising the liquid resin 450. Inside the resin container 430 a platform 470 is positioned which is configured to slowly move down into the resin container 430. The additive manufacturing tool 400 further comprises a laser 410 which emits a laser beam 412 having a wavelength for curing the liquid resin 450 at the locations on the printed material 460 where additional printed material 460 should be added. A re-coating bar 440 is drawn over the printed material 460 before a new layer of printed material 460 is to be applied to ensure that a thin layer of liquid resin 450 is on top of the printed material 460. Emitting using the laser 410 those parts of the thin layer of liquid resin 450 where the additional printed material 460 should be applied will locally cure the resin 450. In the embodiment as shown in FIG. 4A the laser beam 412 is reflected across the layer of liquid resin 450 using a scanning mirror 420. When in the current layer all parts that need to be cured, have been illuminated with the laser beam 412, the platform 470 lowers the printed material 460 further into the liquid resin 450 to allow the re-coating bar 460 to apply another layer of liquid resin 450 on top of the printed material 460 to continue the additive manufacturing process.

Figure 4B:
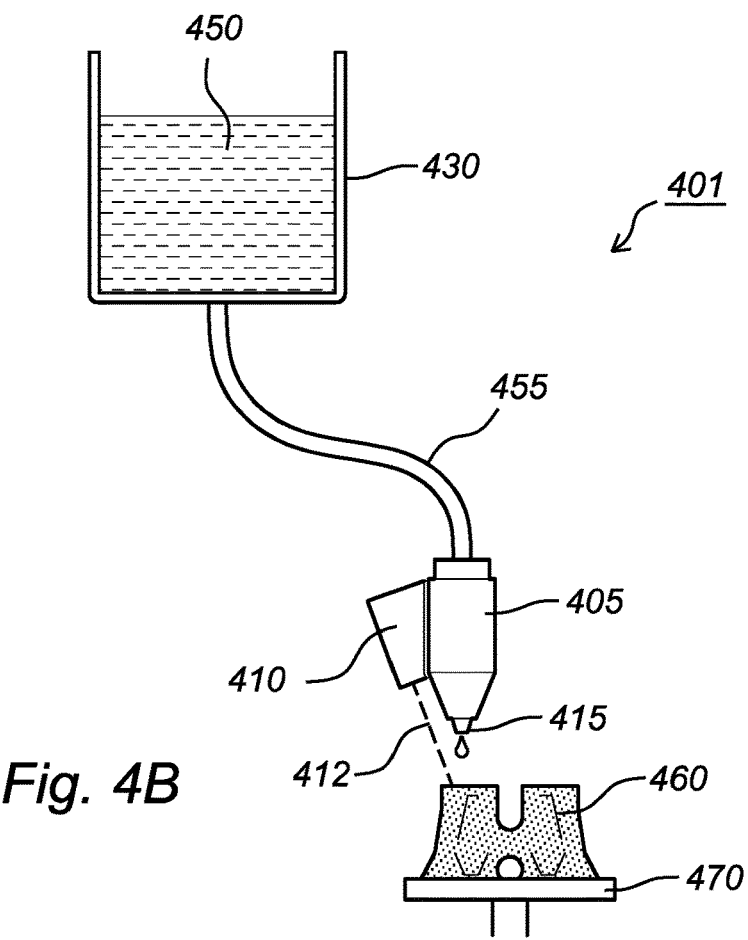
FIG. 4B shows a second embodiment of the additive manufacturing tool in which a liquid resin is dispensed from a dispenser for applying the printed material in the additive manufacturing process.

FIG. 4B shows a second embodiment of the additive manufacturing tool 401 in which a liquid resin 450 is dispensed from a dispenser 405 or print head 405 for applying the printed material 460 in the additive manufacturing process. The additive manufacturing tool 401 again comprises the resin container 430 comprising the liquid resin 450 which is fed via a feed 455 towards the print head 405. The print head 405 further comprises a print nozzle 415 from which droplets of liquid resin 450 are emitted towards the printed material 460. These droplets may fall under gravity from the print head 405 to the printed material 460 or may be ejected from the print nozzle 415 using some ejection mechanism (not shown) towards the printed material 460. The print head 405 further comprises a laser 410 emitting a laser beam 412 for immediately cure the droplet of liquid resin 450 when it hits the printed material 460 to fix the droplet of liquid resin 450 to the already printed material 460. The printed material 460 forming a solid object may be located on a platform 470.

Figure 5A:
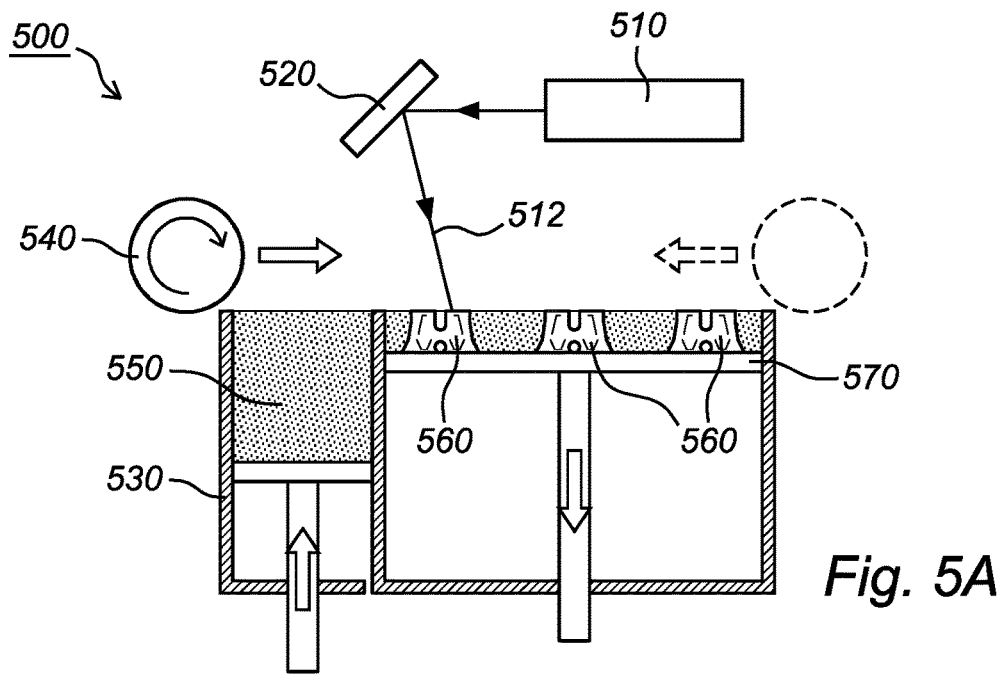
FIG. 5A shows a third embodiment of the additive manufacturing tool in which the material is granulated into small solid particles which are used for applying the printed material in the additive manufacturing process.

FIG. 5A shows a third embodiment of the additive manufacturing tool 500 in which the material is granulated into small solid particles 550 which are used for applying the printed material 560 in the additive manufacturing process. Now, the additive manufacturing tool 500, also known as a Selective Laser Sintering tool 500, or SLS tool 500 comprises a granulate container 530 comprising the granulated small solid particles 550. The printed material 560 is located again on a platform 570 and is completely surrounded by the granulated small solid particles 550. Lowering the platform allows a granulate feed roller 540 to apply another layer of granulated solid particles 550 on the printed material 560. Subsequently locally applying the laser beam 512 using the laser 510 and the scanning mirror 520 will locally melt the granulated solid particles 550 and connects them with each other and with the printed material 560 to generate the next layer of the solid object to be created. Next, the platform 570 moves down further to allow a next layer of granulated solid particles 550 to be applied via the granulate feed roller 540 to continue the next layer in the additive manufacturing process.

Figure 5B:
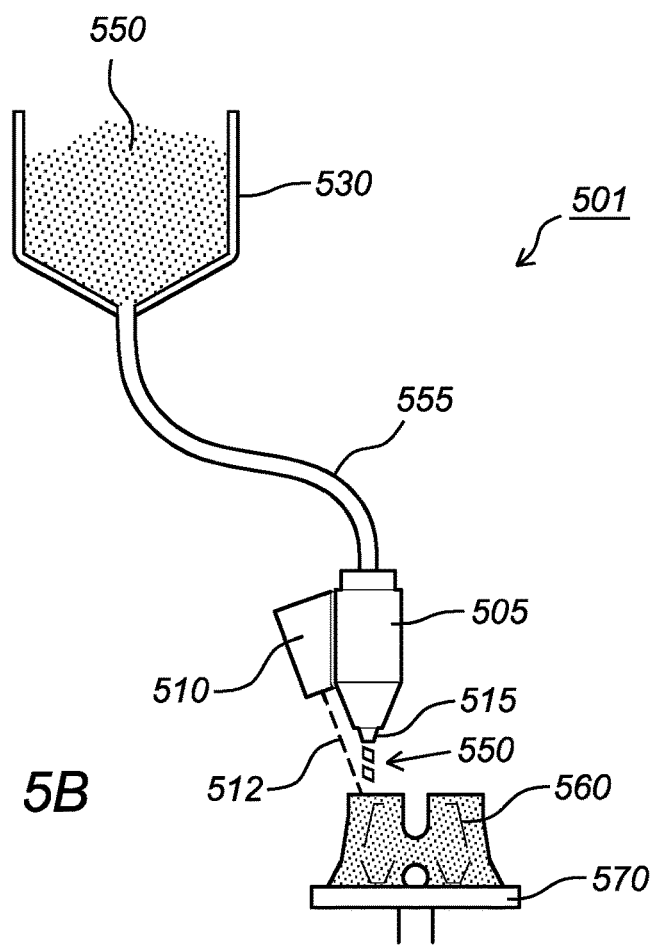
FIG. 5B shows a fourth embodiment of the additive manufacturing tool in which the granulated solid material is dispensed from a dispenser for applying the printed material in the additive manufacturing process.

FIG. 5B shows a fourth embodiment of the additive manufacturing tool 501 or SLS tool 501 in which the granulated solid material 550 is dispensed from a dispenser 505 or print head 505 for applying the printed material 560 in the additive manufacturing process. The additive manufacturing tool 501 again comprises the granulate container 530 comprising the granulated solid particles 550 which are fed via a feed 555 towards the print head 505. The print head 505 further comprises a print nozzle 515 from which granulated solid particles 550 are emitted towards the printed material 560. These solid particles 550 may fall under gravity from the print head 505 to the printed material 560 or may be ejected from the print nozzle 515 using some ejection mechanism (not shown) towards the printed material 560. The print head 505 further comprises a laser 510 emitting a laser beam 512 for immediately melting or sintering the solid particle 550 when it hits the printed material 560 to fix the solid particle 550 to the already printed material 560. The printed material 560 forming a solid object may be located on a platform 570.

Figure 6:
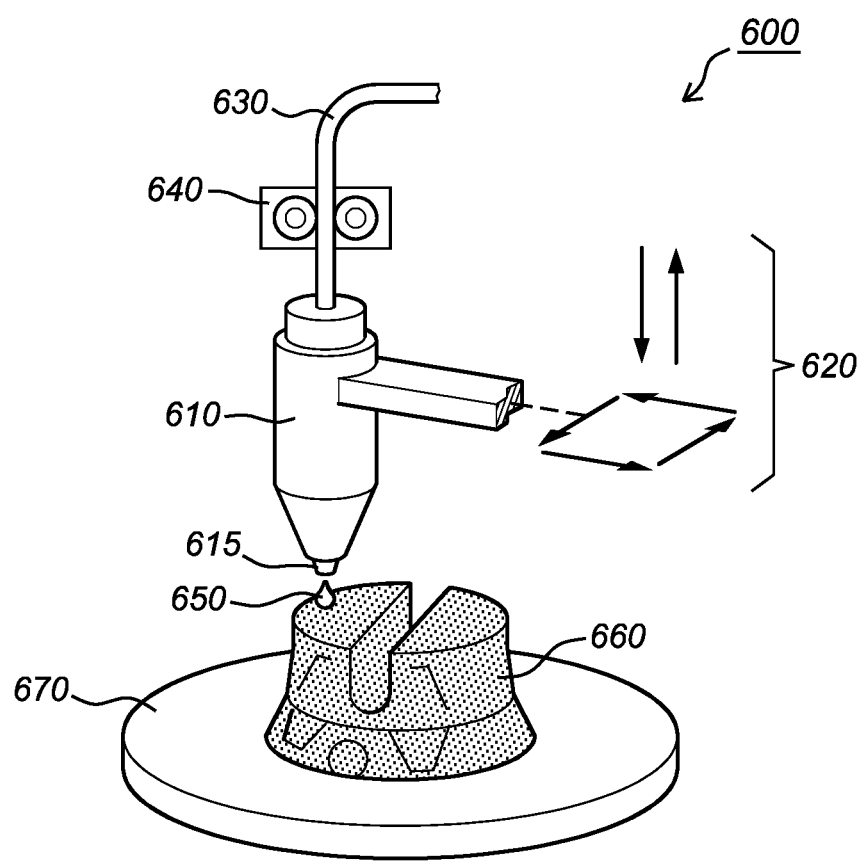
FIG. 6 shows a fifth embodiment of the additive manufacturing tool in which a melted plastic material is dispensed for applying the printed material in the additive manufacturing process.

FIG. 6 shows a fifth embodiment of the additive manufacturing tool 600 in which a melted plastic material 650 is dispensed for applying the printed material 660 in the additive manufacturing process. The additive manufacturing tool 600 shown in FIG. 6 is also known as Fused Deposition Modeling tool 600 or FDM tool 600. Now a plastic filament 630 is fed into a dispenser 610 or melter 610 via a filament feeder 640. The dispenser 610 or melter 610 comprises an extrusion nozzle 615 for melting the plastic filament 630 to form a droplet of melted plastic material 650 which is applied to the printed material 660 where it hardens and connects to the already printed material 660. The dispenser 610 may be configured and constructed to apply the droplet of melted plastic 650 to the printed material 660 under gravity or via an ejection mechanism (not shown). The additive manufacturing tool 600 further comprises a positioning system 620 for positioning the dispenser 610 across the printed material 660.

Summarizing, the invention provides a building block 290, 280 for a mechanical construction. The invention further provides a bearing 200, an actuator system, a gear box, a system and a method of producing the building block. The building block comprises a first printed material 210 printed via an additive manufacturing process on or at least partially embedded in a second material 260. The first printed material is printed in a pattern 212 configured and constructed for cooperating with a sensor 240 for providing, in use, position information of the building block relative to the sensor. The sensor may be a magnetic sensor or an optical sensor. The first printed material may comprise magnetic particles. The method of producing the building block may comprise a step of adding the first printed material to the second material via the additive manufacturing process under the influence of a predefined magnetic field.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

LISTING OF REFERENCE NUMBERS

| | | | |
|---|---|---|---|
| Building block | 100, 230, 280, 290, 330, 350 | Additive manufacturing tool | 400, 401 |
| Pattern | 112, 114, 212, 312 | Printable material | 450, 550, 650 |
| | | Print head | 405, 505 |
| First printed material | 110, 210, 310 | Print nozzle | 415, 515 |
| Second material | 120, 260, 265, 320 | Laser | 410, 510 |
| | | Laser beam | 412, 512 |
| Optical sensor | 140 | Scanning mirror | 420, 520 |
| Light source | 142 | Resin container | 430 |
| Light sensitive element | 144 | Re-coating bar | 440 |
| Magnetic sensor | 240, 340 | Liquid resin | 450 |
| Gear wheel | 100 | Feed | 455, 555 |
| Gear box | 150 | Platform | 470, 570, 670 |
| Motor | 170 | SLS-tool | 500, 501 |
| Shaft | 160, 180 | Granulate container | 530 |
| Bearing | 200, 205 | Granulate feed roller | 540 |
| Roller elements | 205 | Granulate material | 550 |
| Raceway ring | 216 | FDM-tool | 600 |
| Inner ring | 280 | Melter | 610 |
| Outer ring | 290 | Extrusion nozzle | 615 |
| Seal | 230 | Positioning construction | 620 |
| Actuator | 300 | Filament | 630 |
| Traveling unit | 330 | Filament feeder | 640 |
| Static unit | 350 | Liquid plastic | 650 |

The invention claimed is:

1. A building block for a mechanical construction, the building block comprising:
   a first printed material printed via an additive manufacturing process on or at least partially embedded in a second material,
   wherein the first printed material is printed in a pattern configured and constructed for cooperating with a sensor for providing position information of the building block relative to the sensor,
   wherein the pattern of the first printed material comprises a first pattern and a second pattern, the first pattern provides a first signal to the sensor, the second pattern provides a second signal to the sensor, the second signal being different from the first signal, the second pattern comprising a different number of encoding elements then the first pattern, and
   wherein the encoding elements of the second pattern being coaxially arranged and shifted relative to the first pattern relative to provide a combination of the first and second signals that generates an absolute positioning of a gear wheel of the mechanical construction relative to the sensor.

2. The building block according to claim 1, wherein at least a part of the building block is constituted of the second material being second printed material printed via an additive manufacturing process.

3. The building block according to claim 2, wherein the first printed material is completely embedded in the second printed material, or wherein the first printed material is covered by a third material.

4. The building block according to claim 2, wherein an interface between the first printed material and the second printed material comprises a functionally graded interface layer, a composition of the functionally graded interface layer is configured to gradually change from the first printed material via a mixture of the first printed material and the second printed material to the second printed material.

5. The building block according to claim 1, wherein the first printed material:
   comprises magnetic particles for cooperating with a magnetic sensor, or
   constitutes a reflective pattern for cooperating with an optical sensor, or
   constitutes a contrasting pattern relative to the second material for cooperating with an optical sensor, or
   constitutes an opaque pattern surrounded by the second material constituting a reflective surface for cooperating with the optical sensor, or
   constitutes a transmissive pattern surrounded by the second material being opaque for cooperating with the optical sensor, or
   constitutes an opaque pattern surrounded by the second material being transmissive for cooperating with the optical sensor.

6. The building block according to claim 1, wherein the pattern of the first printed material is configured and constructed for generating a block-wave signal at the sensor during a relative movement, or
   wherein the pattern of the first printed material is configured and constructed for generating a sinusoidal-wave signal at the sensor during the relative movement, or
   wherein the pattern of the first printed material is configured and constructed for generating a saw-tooth signal at the sensor during the relative movement.

7. The building block according to claim 1, wherein the first printed material and/or the second printed material is chosen from a list comprising metals, ceramics, polymers, elastomer and their combination in composite materials.

8. The building block according to claim 1, wherein the building block is one of:
   an inner ring for a bearing,
   an outer ring for the bearing,
   a seal of the bearing,
   an traveling unit for an actuator,
   an encoder disc for an angular sensor, or
   a gear wheel.

9. A bearing comprising:
   a building block having;
   a first printed material printed via an additive manufacturing process on or at least partially embedded in a second material, wherein the first printed material is printed in a pattern configured and constructed for cooperating with a sensor for providing position information of the building block relative to the sensor, wherein the pattern of the first printed material comprises a first pattern and a second pattern, the first pattern provides a first signal to the sensor, the second pattern provides-a second signal to the sensor, the second signal being different from the first signal, the second pattern comprising a different number of encoding elements then the first pattern, and wherein the encoding elements of the second pattern being coaxially arranged and shifted relative to the first pattern relative to provide a combination of the first and second signals that generates an absolute positioning of a gear wheel of the mechanical construction relative to the sensor.

10. A method of producing a building block for a mechanical construction, the method comprising:

printing of a first printed material via an additive manufacturing process on or at least partially embedded in a second material, wherein the first printed material is printed in a pattern configured and constructed for cooperating with a sensor for providing position information of the building block relative to the sensor, wherein the pattern of the first printed material comprises a first pattern and a second pattern, the first pattern provides a first signal to the sensor, the second pattern provides-a second signal to the sensor, the second signal being different from the first signal, the second pattern comprising a different number of encoding elements then the first pattern, and wherein the encoding elements of the second pattern being coaxially arranged and shifted relative to the first pattern relative to provide a combination of the first and second signals that generates an absolute positioning of a gear wheel of the mechanical construction relative to the sensor.

11. A method of producing the building block according to claim 10, wherein the first printed material comprises magnetic particles, wherein the method of producing the building block comprises a step of:

adding the first printed material to the second material via the additive manufacturing process under the influence of a predefined magnetic field.

* * * * *